No. 778,188. PATENTED DEC. 20, 1904.
J. D. GREEN.
BURNER.
APPLICATION FILED NOV. 18, 1902.
NO MODEL.
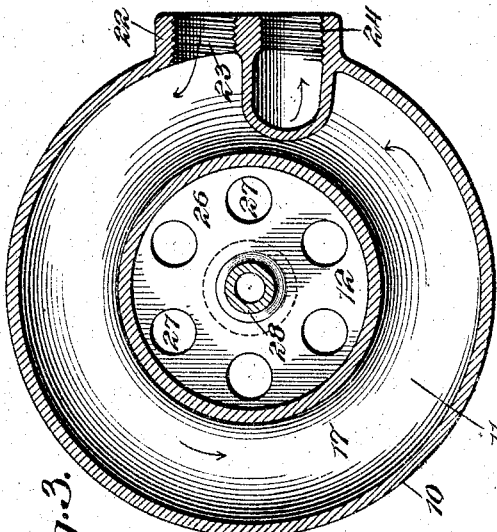
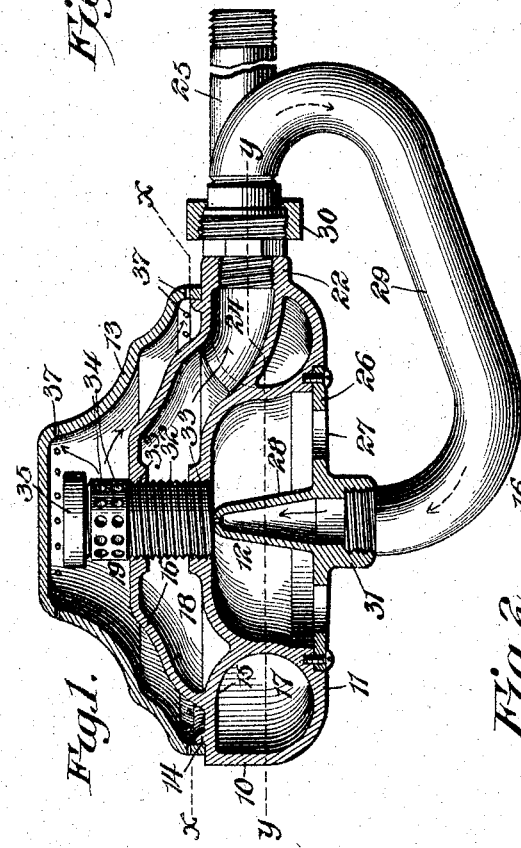
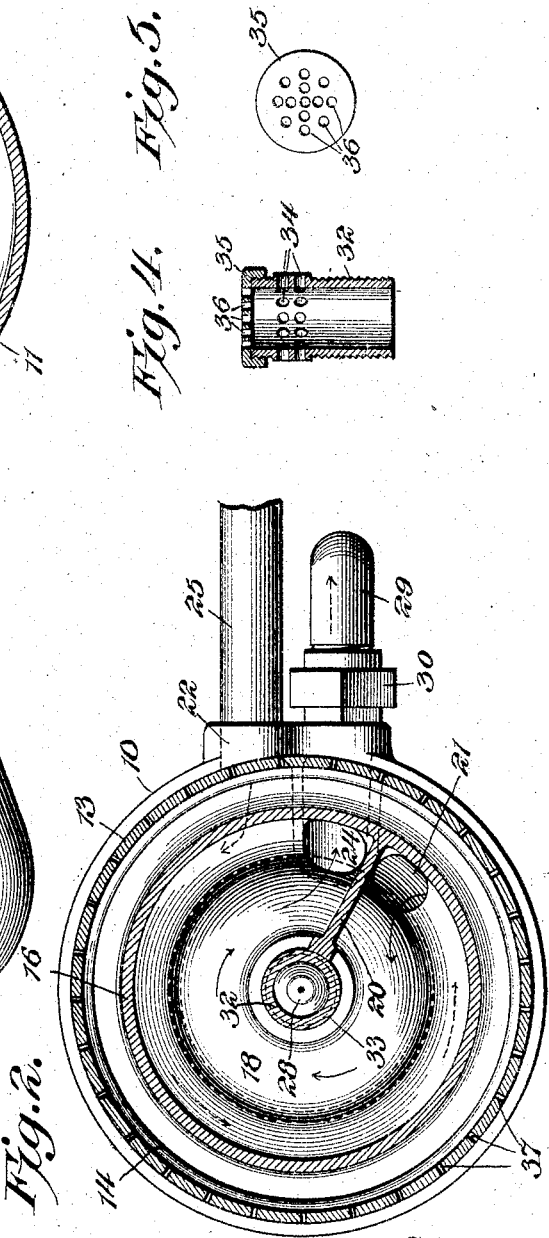
Witnesses
Howard D. Orr.
B. G. Foster.
Inventor,
John D. Green,
By E. G. Siggers.
Attorney No. 778,188.

Patented December 20, 1904.

UNITED STATES PATENT OFFICE.

JOHN DANIEL GREEN, OF TOLEDO, OHIO, ASSIGNOR OF ONE-HALF TO GEORGE L. MILLS, ARTHUR R. GORDON, AND W. E. DITTENHAVER, OF TOLEDO, OHIO.

BURNER.

SPECIFICATION forming part of Letters Patent No. 778,188, dated December 20, 1904.

Application filed November 18, 1902. Serial No. 131,883.

*To all whom it may concern:*

Be it known that I, JOHN DANIEL GREEN, a citizen of the United States, residing at Toledo, in the county of Lucas and State of Ohio, have invented a new and useful Burner, of which the following is a specification.

This invention relates particularly to burners for use in furnaces or stoves, though useful in other relations.

The object, as in the case of the burner set forth in copending application, Serial No. 131,882, is to provide a simple structure designed more especially for burning gas, though hydrocarbon oil may be used, which will gradually heat the fuel, mix it with air, and thoroughly commingle the same before burning the mixture, thus insuring complete combustion, and consequently eliminating all odors and soot.

The preferred form of construction is shown in the accompanying drawings, wherein—

Figure 1 is a vertical sectional view through the improved structure. Fig. 2 is a horizontal sectional view taken on the line $x\ x$ of Fig. 1. Fig. 3 is also a horizontal view taken on the line $y\ y$ of Fig. 1. Fig. 4 is a vertical sectional view through the conduit for the mixture of gas and air, and Fig. 5 is a top plan view of the same.

Similar numerals of reference designate corresponding parts in all the figures of the drawings.

In the embodiment illustrated a circular casing is employed comprising an outer wall 10 and a bottom wall 11, having a central depression 12, forming a pocket. A removable cap 13 constitutes a part of this casing and detachably fits in a socket formed by an annular upstanding flange 14, located at the upper end of the side wall 10 and inset slightly from the outer edge thereof. Partition-walls 15 and 16 subdivide the interior of the casing into channels 17 and 18 and an upper reservoir-compartment 19, this latter compartment being formed by the cap 13 and the upper partition-wall 16, which wall is spaced from the cap, as clearly shown in Fig. 1. The lower channel 17 may be termed a "heating-chamber," while the upper channel 18 constitutes a superheating-chamber, this latter chamber being divided by a transverse wall 20. The two chambers have communication through an opening 21, formed in the partition-wall 15 and located contiguous to the wall 20. The casing is provided at one side with a projecting nipple 22, having separate passage-ways 23 and 24 therethrough, the former leading to the heating-chamber 17, the latter being in communication with the superheating-chamber on the side of the partition 20 opposite the opening 21. A suitable supply-pipe 25 is screwed into the passage-way 23.

Arranged in the depression or pocket 12 of the casing is a mixer comprising a face-plate 26, having openings 27 therethrough and a centrally-disposed inwardly-projecting nozzle 28, this nozzle being connected with the outlet 24 of the superheating-chamber by means of an elbow 29, connected at one end by a coupling 30 with the outlet and having its other end threaded into a boss 31, formed upon the mixer. The discharge end of the nozzle 28 terminates at the end of an upright conduit 32, which is screwed into centrally-arranged openings 33, formed in the wall 16 and the bottom of the casing, the upper end of this conduit being located in the reservoir-compartment 19 and forming a head which is perforated, as shown at 34. The upper end of the conduit is closed by a cap, as 35, which may also be provided with perforations 36. The cap 13 of the casing has burner-outlets 37, an annular series of which is arranged at the top of the cap, while another similar series is preferably located at the lower end thereof.

Assuming the burner ignited at the outlets 37, it will be apparent that gas entering said burner through a supply-pipe will first pass through the chamber 17, where it will be slightly heated, and from thence through the opening 21 it will enter the chamber 18, where it will be superheated. From thence it will be conducted by the elbow 29 into and through the mixer. Discharging from the nozzle 28 it will entrain the air, and the two elements will be thoroughly commingled by their passage through the discharge-head of the conduit. From the reservoir-compartment 19 the mixture will pass through the outlets 37 and be ignited. Because of the tortuous passage through which the gas must necessarily pass thorough heating is assured, and not only is the air completely commingled with the gas, but it will also be heated in its passage through the burner. The structure as herein set forth is a practical embodiment of the invention, and it will be apparent that it may be cheaply manufactured, the parts being simple and not liable to derangement.

From the foregoing it is thought that the construction, operation, and many advantages of the herein-described invention will be apparent to those skilled in the art without further description; and it will be understood that various changes in the size, shape, proportion, and minor details of construction may be resorted to without departing from the spirit or sacrificing any of the advantages of the invention.

Having thus described my invention, what I claim, and desire to secure by Letters Patent, is—

1. In a burner, the combination with a casing having a burner-outlet, of a mixer, a conduit leading from the mixer and carrying a perforated head located within the casing between the mixer and the burner-outlet, said head being spaced from the walls of the casing.

2. In a burner, the combination with a casing having burner-outlets in its upper wall, of partition-walls dividing the interior of the casing into separate compartments, a mixer arranged at the bottom of the casing, and a conduit leading from the mixer through the compartments and carrying an upstanding perforated head located within the upper portion of the casing and between the mixer and the burner-outlets, said head extending over the end of the conduit and being spaced from the top of the casing.

3. In a burner, the combination with a circular casing having burner-outlets in its upper wall, of transversely-disposed partition-walls dividing the interior of the casing into separate compartments, a mixer arranged at the bottom of the casing, a centrally-disposed, upright conduit leading from the mixer through the compartments and projecting into the upper portion of the casing, and a head located upon and carried by the upper end of the conduit in spaced relation to the walls of the casing and having perforations in its end and sides.

4. In a burner, the combination with a casing having a detachable cap that is provided with a plurality of burner-outlets, of integral partition-walls dividing the interior of the casing into separate compartments, the upper partition being located below the cap, thereby forming a reservoir-compartment, a mixer arranged at the bottom of the casing, and an upright conduit leading from the mixer through the compartments and carrying a head located within the reservoir-compartment and spaced from the cap, said head being provided in its end and sides with perforations.

5. In a burner, a casing, spaced partitions extending across the casing and dividing the space therein into separate upper and lower compartments, the upper one constituting a reservoir having burner-outlets, an upright conduit screwed into the several partitions and having a perforated head at its inner end that is located in the reservoir-compartment, means for introducing fuel to the lower compartment and a mixer for delivering fuel into the outer end of the conduit and having connection with the lower compartment.

6. In a burner, a casing having a depression in its bottom wall forming a pocket, a conduit extending from the upper end of the pocket into the upper end of the casing, and a mixer comprising a perforate face-plate covering the pocket and carrying a nozzle that is located in the pocket and projects toward the conduit.

In testimony that I claim the foregoing as my own I have hereto affixed my signature in the presence of two witnesses.

JOHN DANIEL GREEN.

Witnesses:
 CLEM V. WAGNER,
 H. J. DEWEY.